United States Patent [19]

Kambara et al.

[11] Patent Number: 6,005,348
[45] Date of Patent: Dec. 21, 1999

[54] CIRCUIT KEEPING DAYTIME HEAD LAMPS ON AFTER ENGINE AND HEAD LAMP SWITCH ARE TURNED OFF

[75] Inventors: Jun Kambara, Kanagawa-ken; Harushige Yamamoto, Tokyo, both of Japan

[73] Assignees: Nissan Motor Co., Ltd., Kanagawa-ken; Niles Parts Co., Ltd., Tokyo, both of Japan

[21] Appl. No.: 08/810,481

[22] Filed: Mar. 3, 1997

[30] Foreign Application Priority Data

Mar. 11, 1996 [JP] Japan .................................. 8-053171

[51] Int. Cl.⁶ .................................................. H05B 37/02
[52] U.S. Cl. ............................... 315/82; 315/83; 307/10.8
[58] Field of Search ..................... 307/9.1, 10.3, 307/10.6, 10.8; 315/76, 77, 78, 82, 83, 84

[56] References Cited

U.S. PATENT DOCUMENTS

| | | | |
|---|---|---|---|
| 3,769,519 | 10/1973 | Adamian | 307/10.8 |
| 4,841,199 | 6/1989 | Irie | 315/83 |
| 4,928,036 | 5/1990 | Abboud | 315/82 |
| 5,592,146 | 1/1997 | Kover | 340/468 |
| 5,666,028 | 9/1997 | Bechtel et al. | 315/82 |

*Primary Examiner*—David H. Vu
*Attorney, Agent, or Firm*—McDermott, Will & Emery

[57] ABSTRACT

A twilight delay apparatus includes an automatic switching unit for switching a daytime running light control unit to an actuated state for a predetermined time, the daytime running light control unit being used to light the right and left head lamps by switching them to a series connection even in the daytime in response to a lit state maintaining output of a twilight delay unit instead of the operation of the start of an engine.

4 Claims, 3 Drawing Sheets

CIRCUIT KEEPING DAYTIME HEAD LAMPS ON AFTER ENGINE AND HEAD LAMP SWITCH ARE TURNED OFF

BACKGROUND OF THE INVENTION

1. Field of the Invention

The present invention relates to a twilight delay apparatus for maintaining lights in a lit state for a predetermined time when a driver gets off a vehicle etc. at night and the like.

2. Prior Art

Conventionally, a so-called daytime running light (DTRL) for automatically lighting right and left head lamps by switching them to a series connection even in the daytime as an engine starts is legally compelled for vehicles etc. in such areas as, for example, Canada, Northern Europe, Great Britain and the like where even the daytime is in a twilight state by the effect of the midnight sun.

On the other hand, although a driver usually puts off head lamps when he gets off a vehicle, there is pointed out that, in countries and regions where the public order is not so good, there is a tendency that many crimes are committed when the driver leaves the vehicle in a completely dark state at night. As to this point, an apparatus called twilight delay is being put into practical use to prevent a complete dark state by lighting the head lamps for a predetermined time such as, for example, for two to three minutes by a timer even after a light switch is turned off.

However, in a conventional twilight delay apparatus, since right and left head lamps are continuously lit by a timer for a predetermined time in the same state as they are usually lit, a battery is made dead by the lighting due to a great current consumption, and it required a complicated wiring, which is liable to cause an increase of ratio of malfunctions and troubles.

SUMMARY OF THE INVENTION

In view of such problems of prior art, an object of the present invention is to provide a twilight delay apparatus at a low cost and can reduce a battery consumption, as well.

To achieve the above object, there is provided a twilight delay apparatus in a vehicle, comprising: daytime running light control means for lighting head lamps in response to the start of an engine even in the daytime; twilight delay means for maintaining, when a driver gets off the vehicle in the state that the surroundings are dark, the head lamps in a lit state for a predetermined time after a light switch for controlling the ON/OFF of the head lamps is turned off, and automatic switching means for switching the daytime running light control means to an actuated state for a predetermined time in response to a lit state maintaining output of the twilight delay means instead of the operation of the start of the engine.

With this arrangement, when the driver gets off the vehicle in the state that the surroundings are dark at night or the like, the daytime running light control means is actuated for the predetermined time after the light switch is turned off to thereby light the right and left head lamps by switching them to a series connection, and a completely dark state can be prevented.

In a preferred embodiment of the present invention, the invention further comprises automatic lighting means for automatically lighting the head lamps when the surroundings are dark, and when the surroundings are bright, the daytime running light control means operated by the automatic switching means is stopped in response to the output from the automatic lighting means.

With this arrangement, since it is meaningless to light the head lamps for the predetermined time when the driver gets off the vehicle in the state that the surroundings are bright, the operation of the daytime running light control means is stopped in response to the output from the automatic lighting means.

In a preferred embodiment of the present invention, the invention further comprises keyless remote control door lock transmission means, and the daytime running light control means operated by the automatic switching means is stopped in response to a signal transmitted when the keyless remote control door lock transmission means is subjected to a predetermined actuation.

With this arrangement, since it is meaningless to light the head lamps for the predetermined time after a driver has moved to a bright place such as a house or the like after getting off the vehicle, the operation of the daytime running light control means can be stopped in response to a signal transmitted by manipulation of the keyless remote control door lock transmission means in a predetermined manner, for example, pressing a lock button twice.

In a preferred embodiment of the present invention, the invention is arranged such that the daytime running light control means lights the right and left head lamps by switching them to a series connection.

In a preferred embodiment of the present invention, the invention is arranged such that the daytime running light control means lights the head lamps by reducing the light thereof by connecting a dropping resistor.

In a preferred embodiment of the present invention, the invention is arranged such that the daytime running light control means lights the head lamps by reducing the light thereof by pulse width modulation.

Further, to achieve the above object, there is provided a twilight delay apparatus in a vehicle in which right and left head lamps are lit by being switched to a series connection in response to the start of an engine even in the daytime and when a driver gets off the vehicle in the state that the surroundings are dark, the head lamps are maintained in a lit state for a predetermined time after they are turned off, wherein the right and left head lamps are maintained in the lit state for the predetermined time by being switched to a series connection after they are turned off in response to an output for maintaining them to the lit state for the predetermined time instead of the operation of the start of the engine.

With this arrangement, when the driver gets off the vehicle in the state that the surroundings are dark at night or the like, since the right and left head lamps are switched to a series connection and lit for the predetermined time after they are turned off, and the surroundings are prevented from being made completely dark.

The nature, principle and utility of the invention will become more apparent from the following detailed description when read in conjunction with the accompanying drawings.

DESCRIPTION OF THE PREFERRED EMBODIMENTS

Embodiments of the present invention will be described below with reference to the accompanying drawings.

Figure 1:
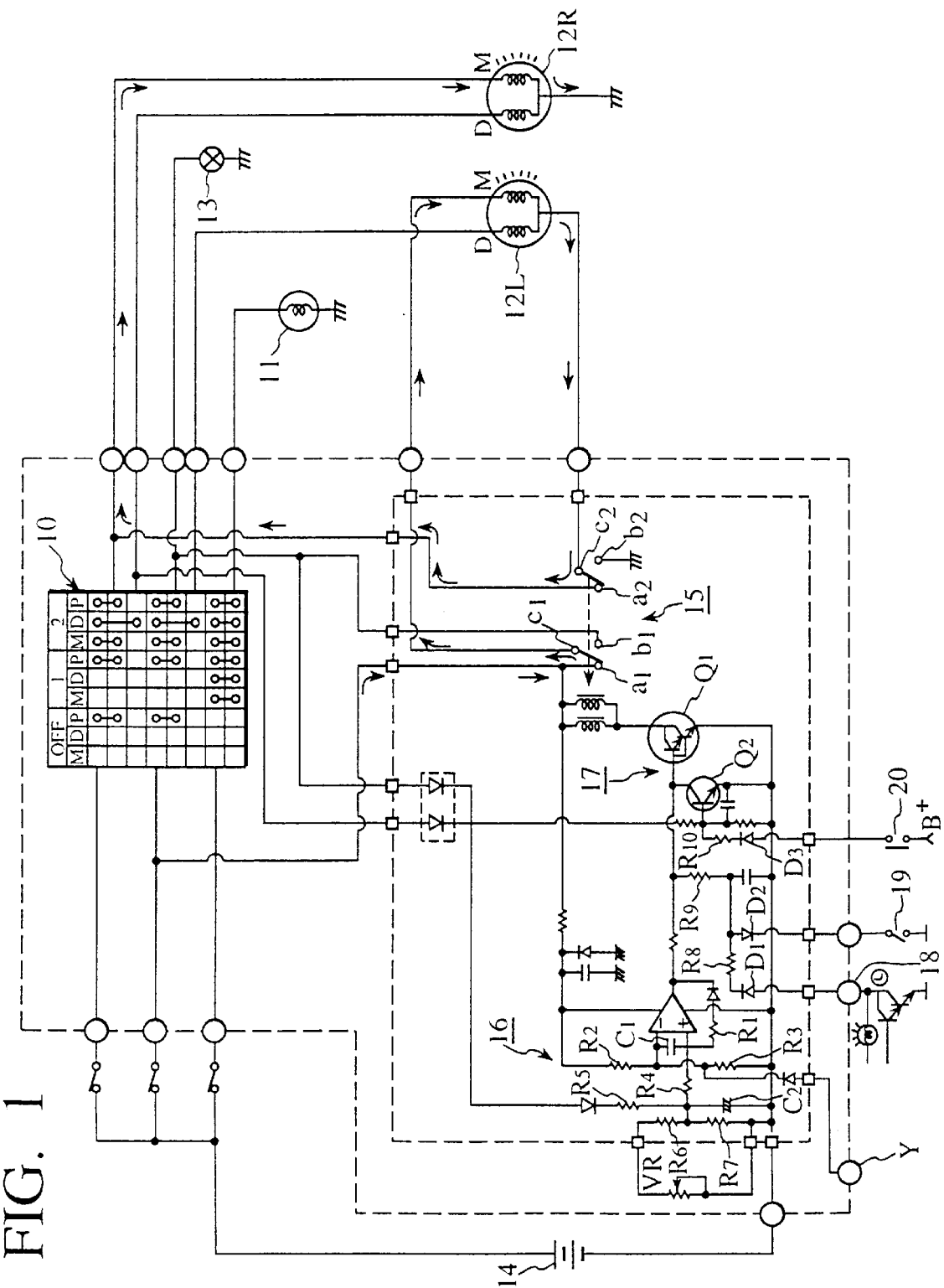
FIG. 1 is a circuit diagram showing a first embodiment of a twilight delay apparatus according to the present invention.

FIG. 1 is a circuit diagram showing a first embodiment of the present invention. First, the arrangement of a twilight delay apparatus will be described. In the drawing, numeral reference 10 denotes a light switch, numeral reference 11 denotes a tail lamp, numeral reference 12L denotes a left head lamp and numeral reference 12R denotes a right head lamp. In both the right and left head lamps 12R, 12L, symbol M denotes a main high beam, symbol D denotes a dimmer low beam. Contacts of the light switch 10 is connected to light the tail lamp 11 when the switch is turned to 1 shown therein and to light the right and left head lamps 12R, 12L when it is turned to 2 in the drawing, thus the voltage of a battery 14 is supplied to the respective lamps through the connected contact to permit the tail lamp 11 and the right and left head lamps 12R, 12L to be lit, respectively. In the switch, symbol M denotes high beam, symbol D denotes dimmer and P denotes passing. When the switch is pulled in the passing P, the high beam M is lit while it is being pulled and the release of the switch causes the lighting to return to the dimmer D. On the other hand, when the switch is pushed, lighting is changed to steady lighting of the high beam M. Numeral reference 13 denotes a warning lamp as a blue lamp for giving a warning when the high beam M is lit.

Numeral reference 15 denotes a relay constituting a daytime running light controller, the relay including two sets of switching relay contacts constituting movable contacts $c_1$, $c_2$ and stationary contacts $a_1$ and $b_1$, and $a_2$ and $b_2$ which are in association with each other. The stationary contact $a_1$ is connected to the battery 14, the two movable contacts $c_1$, $c_2$ are connected to both ends of the high beam M of the left head lamp 12L, and the stationary contact $a_2$ is connected to the high beam M of the right head lamp 12R. Numeral reference 16 denotes a timer acting as a twilight delay unit consisting of an operational amplifier, resistors $R_1$ to $R_7$, a variable resistor VR, capacitors $C_1$, $C_2$ and the like. Although the timer is usually regulated to measure about three minutes, the regulated time is variable by adjusting the variable resistor VR. Numeral reference $Q_1$ denotes a transistor circuit having a Darlington pair, numeral reference $Q_2$ denotes a transistor for driving the above transistor with the collector of the transistor $Q_1$ connected to the exciting coil of the relay 15. An automatic switching unit 17 consists of these two transistors $Q_1$ and $Q_2$ and connected between the output of the twilight delay unit 16 and the relay 15. Numeral reference 18 denotes the L-terminal of a voltage regulator, and the L-terminal is connected to the base of the transistor $Q_1$ through a forward-connected diode $D_1$ and resistors $R_8$, $R_9$.

The L-terminal 18 is set to an H-level potential with the start of an engine, and the transistor $Q_1$ is turned on by the H-level potential to thereby actuate the relay 15 to permit the daytime running light to be lit. Numeral reference 19 denotes a parking switch connected to the base of the transistor $Q_1$ through a reverse-connected diode $D_2$ and the resistor $R_9$. When the parking switch 19 is turned on, although the transistor $Q_1$ is turned off to thereby turn off the daytime running light, the twilight delay unit 17 is operable. Numeral reference 20 denotes a starter switch.

Next, operation of the twilight delay apparatus arranged as described above will be explained. When the exciting coil is not energized, the two movable contacts $c_1$, $c_2$ of the relay 15 are connected to the stationary contacts b1, b2. When the engine starts, the L-terminal 18 is set to the H-level, the transistor $Q_1$ is turned on, the relay 15 is actuated and the two movable contacts $c_1$, $c_2$ are switched to the stationary contacts $a_1$, $a_2$, respectively (the state as shown in the drawing). The respective high beams M of the right and left head lamps 12R, 12L are switched to a series connection by switching of the contacts, so that the voltage of the battery 14 causes half as much current as usual to flow as shown by an arrow mark in the drawing, thereupon the daytime running light is lit by the current.

Next, when the light switch 10 is actuated to turn on the head lamps, the transistor $Q_2$ is turned on and the transistor $Q_1$ is turned off to thereby return the two movable contacts $c_1$, $c_2$ of the relay 15 to the side of the stationary contacts $b_1$, $b_2$ to light the right and left head lamps 12R, 12L in a usual state.

After the vehicle has traveled with the head lamps turned on, when the engine stops and the light switch is turned off, the transistor $Q_2$ is turned off and the twilight delay unit 16 is actuated and the transistor $Q_1$ is turned on by the timer output from the twilight delay unit 16, so that the daytime running light lit again for a timer set time, for example, only three minutes. After the timer time elapses, all of them are turned off. With the actuation of the daytime running light by the timer, when the driver gets off the vehicle in the state that the surroundings are dark at night or the like, complete darkness is prevented by a consumption of a small amount of current. Note, a light may be reduced by inserting a dropping resistor instead of the series connection of the right and left head lamps 12R, 12L. Further, a light may be reduced by a pulse width modulation (PWM) executed by a semiconductor device such as an FET or the like.

Figure 2:
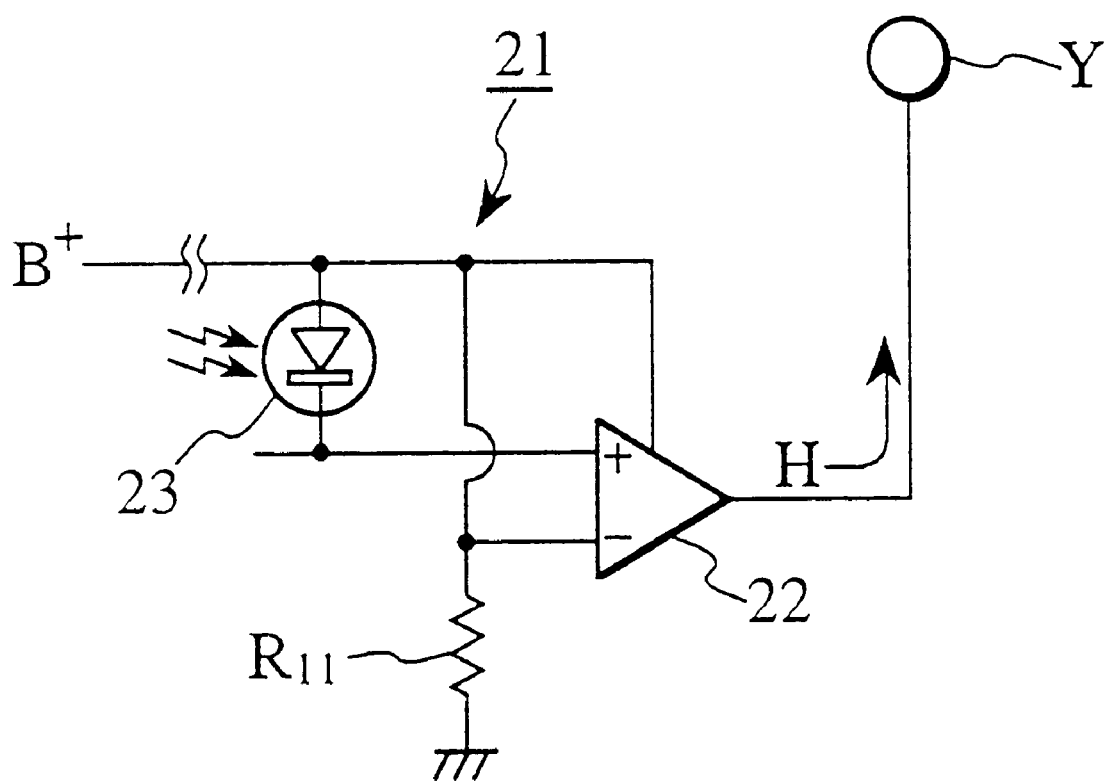
FIG. 2 is a circuit diagram showing the arrangement of an automatic lighting unit in a second embodiment of the twilight delay apparatus according to the present invention.

FIG. 2 is a circuit diagram showing the arrangement of an automatic light unit in a second embodiment of the twilight delay apparatus of the present invention. Although it is effective to secure safety when the daytime running light is lit by the timer at the time when the driver gets off the vehicle in the state that the surroundings are dark at night or the like as described above, it is meaningless to turn on the daytime running light by the timer when the driver gets off the vehicle at the time the surroundings are bright in the daytime or the like. Thus, in this embodiment, when the surroundings are bright at the time when the driver gets off the vehicle, the timer actuation of the twilight delay unit 1 is canceled to put out the daytime running light by making use of the output of an automatic lighting unit for automatically lighting the right and left head lamps 12R, 12L when the surroundings are dark. In FIG. 2, an automatic lighting unit 21 is arranged such that a voltage produced to a resistor $R_{11}$ by a current from the battery 14 is input to the inverted input terminal (−) of a comparator 22. A photoelectric conversion device 23 such as a photo transistor or the like is connected between the input terminal of the battery voltage and the non-inverted input terminal (+) of the comparator 22. The output terminal of the comparator 22 is connected to a Y-terminal also shown in FIG. 1. In the above arrangement, when the surroundings are bright, the output from the automatic lighting unit 21 is set to an H-level so that the actuation of the twilight delay unit 16 is unconditionally turned off to thereby stop the lighting of the daytime running light.

Figure 3:
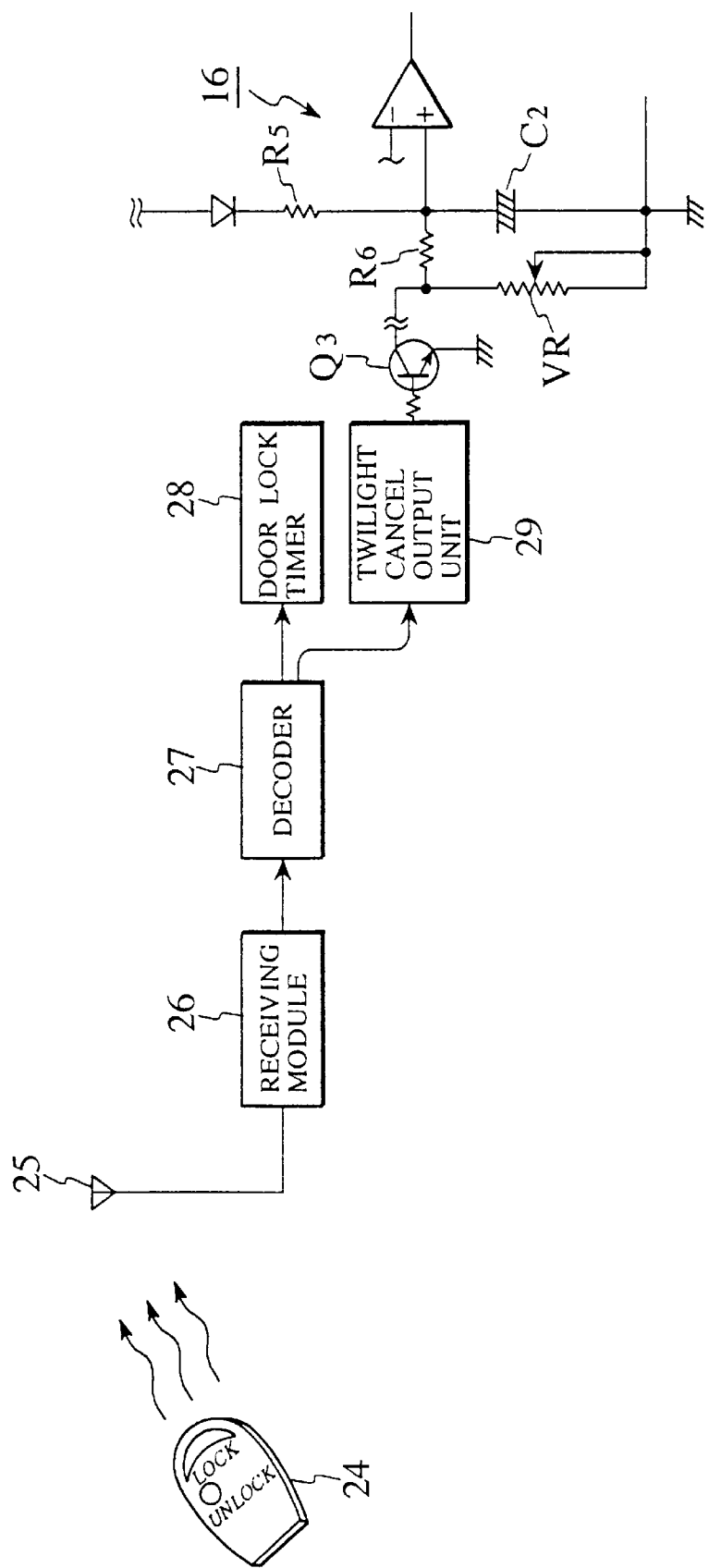
FIG. 3 is a view showing the portion of a keyless remote control door lock mechanism and the like in a third embodiment of the twilight delay apparatus according to the present invention.

FIG. 3 is a view showing the portion of a keyless remote control door lock mechanism and the like in a third embodiment of the twilight delay apparatus according to the present invention. As described above, when the driver gets off the vehicle at the time the surroundings are dark at night or the like, the daytime running light is lit by the timer. However, it is meaningless to continuously light the daytime running light after the driver has moved to a bright and safe place such as a house or the like after getting off the vehicle. Thus, in this embodiment, after the driver gets of the vehicle and moves to the bright place, the timer actuation of the twilight delay unit 16 is canceled to stop the lighting of the daytime running light by making use of the keyless remote control door lock mechanism.

In FIG. 3, numeral reference 24 denotes a keyless door lock transmitter as a keyless remote control door lock transmitting unit, numeral reference 25 denotes a receiving antenna (or an infrared rays receiving unit) for receiving a signal transmitted from the transmitter 24, numeral reference 26 denotes a receiving module, numeral reference 27 denotes a decoder for outputting a signal corresponding to the signal transmitted from the keyless door lock transmitter, and numeral reference 28 denotes a door lock timer. These devices are conventionally provided as the keyless remote control door lock mechanism. In the embodiment, a twilight cancel output unit 29 is connected to the output of the decoder 27 in the mechanism and a switching device $Q_3$ is further connected to the output stage of the twilight cancel output unit 29. The collector of the switching device $Q_3$ is connected to the non-grounded terminal of the variable resistor VR of the twilight delay unit 16.

In the above arrangement, when the keyless door lock transmitter 24 is subjected to a predetermined actuation, for example, a lock button is pressed twice, a signal corresponding to the predetermined actuation is output from the decoder 27 and an H-level cancel output is generated from the twilight cancel output unit 29 by the output signal to thereby turn on the switching device $Q_3$. The turning-on of the switching device $Q_3$ short-circuits the variable resistor VR of the twilight delay unit 16. As a result, the timer operation of the twilight delay unit 16 is canceled by the rapid discharge of the voltage charged to the capacitor $C_2$ regulating a timer time in combination with the variable resistor VR, so that the lighting of the daytime running light is stopped.

As described above, according to the present invention, since there is provided the automatic switching unit for switching the daytime running light control unit to an actuated state for a predetermined time in response to the lit state maintaining output in the twilight delay unit instead of the operation of the start of the engine, when a driver gets off the vehicle in the state that the surroundings are dark at night or the like, the right and left head lamps are switched to a series connection and lit for a predetermined time after the light switch is turned off, thus the current consumption of the battery can be reduced by half. Further, the conventionally provided daytime running light control unit and twilight delay unit can be also used, resulting in reducing of cost.

According to the present invention, since the daytime running light control unit actuated by the automatic switching unit is stopped by the output from the automatic lighting unit when the surroundings are bright. Thus, since the lighting of the head lamps for the predetermined time is stopped when the surroundings are bright, the consumption of the battery can be further reduced. In addition, since the conventionally provided automatic lighting unit can be also used, a low cost can be achieved in this respect.

According to the present invention, since the daytime running light control unit operated by the automatic switching unit is stopped in response to the signal transmitted when the keyless remote control door lock transmitting unit is subjected to the predetermined actuation, the lighting of the head lamps for the predetermined time can be stopped by the signal transmitted when the keyless remote control door lock transmitting unit is subjected to the predetermined actuation after the driver gets off the vehicle and moves to a bright place such as a house or the like. Thus, the battery consumption can be further reduced. In addition, since the conventionally provided keyless remote control door lock unit can be used, a cost reduction can be achieved in this respect.

Further, according to the present invention, the right and left head lamps are maintained in a lit state for the predetermined time by being switched to a series connection in response to the output for maintaining the lit state for the predetermined time after the head lamps are turned off instead of the operation of the start of the engine. Therefore, when the driver gets off the vehicle in the state that the surroundings are dark at night or the like, since the head lamps are switched to the series connection and lit for the predetermined time after they are turned off, the current consumption of the battery can be reduced by half.

It should be understood that many modifications and adaptations of the invention will become apparent to those skilled in the art and it is intended to encompass such obvious modifications and changes in the scope of the claims appended hereto.

What is claimed is:

1. A twilight delay apparatus in a vehicle, comprising:
   lighting means for lighting right and left head lamps; and
   connection control means for connecting the lamps to one of a parallel connection and a series connection, said connection control means connecting the lamps to the series connection in response to starting of an engine, connecting the lamps to the parallel connection in response to turning ON of a light switch, and connecting the lamps to the series connection for a predetermined time in response to turning OFF of the light switch.

2. A twilight delay apparatus in a vehicle, comprising:
   a lighting circuit for lighting right and left head lamps; and
   a connection control circuit for connecting the lamps to one of a parallel connection and a series connection, said connection control means connecting the lamps to the series connection in response to starting of an engine, connecting the lamps to the parallel connection in response to turning ON of a light switch, and connecting the lamps to the series connection for a predetermined time in response to turning OFF of the light switch.

3. A twilight delay apparatus for a vehicle in which right and left head lamps are lit in response to starting of the vehicle engine even in the daytime and maintained in the lit state for a predetermined time period after stopping of the vehicle engine, comprising:
   a timer for providing an output for the predetermined time period; and
   means for switching the right and left head lamps to a series connection between a battery and ground in response to starting of the vehicle engine, said means for switching receiving the output from the timer to maintain the right and left head lamps in the series connection for the predetermined time period in response to stopping of the vehicle engine.

4. The twilight delay apparatus according to claim 3, further comprising:
  a head lamp switch having an ON position and an OFF position for turning the right and left head lamps on and off;
  means for disconnecting the right and left head lamps from the series connection in responsive to the ON position of the head lamp switch while the vehicle engine is on and connecting the right and left head lamps to the series connection in response to the OFF position of the head lamp switch while the vehicle engine is on, wherein
  the right and left head lamps turn off after elapse of the predetermined time period when the head lamp switch is in the OFF position.

* * * * *